US005352396A

United States Patent [19]

Zaragueta

[11] Patent Number: 5,352,396

[45] Date of Patent: Oct. 4, 1994

[54] METHOD OF FABRICATING CERAMIC TILE

[76] Inventor: Juan J. L. Zaragueta, calle Europa, 2 Benicasim (Catello), Spain

[21] Appl. No.: 981,599

[22] Filed: Nov. 25, 1992

Related U.S. Application Data

[62] Division of Ser. No. 574,588, Aug. 29, 1990, abandoned.

[30] Foreign Application Priority Data

Aug. 31, 1989 [ES] Spain .................................... 8902984

[51] Int. Cl.[5] ............................................... C04B 33/34

[52] U.S. Cl. ......................................... 264/62; 264/67; 264/120; 264/154

[58] Field of Search ..................... 264/62, 67, 120, 154

[56] References Cited

U.S. PATENT DOCUMENTS

| | | | |
|---|---|---|---|
| 903,300 | 11/1908 | Marvick | 52/603 |
| 1,737,847 | 12/1929 | Hottinger | 264/154 |
| 3,210,450 | 10/1965 | Bratton | 264/154 |
| 3,627,861 | 12/1971 | Timke | 267/67 |

FOREIGN PATENT DOCUMENTS

| | | | |
|---|---|---|---|
| 1524124 | 9/1978 | United Kingdom | 264/67 |

*Primary Examiner*—James Derrington

[57] ABSTRACT

The object of the invention is to provide a ceramic tile which is rectangular in shape and has an opening near one of its ends. The corners have grooves, while at the other end, it is cut off to form a skirt. The tile is fabricated by means of moulding ceramic stoneware in two pressings. A step is created around the opening during the first pressing, which descends and runs peripherally all along the edge of the tile. The tile has grooves on its parallel sides which form the casing for the retention heads, from which the tiles hang when they are placed on the roof. The entire piece is shaped in the course of the second pressing which maintains the descending steps of the grooves and forms in a hidden side of the part an orthogonal striation which is above the step and the grooves, whose length defines the maximum and minimum overlapping of the tile. The outer side of the tile and the borders are glazed with a synterized enamel.

8 Claims, 2 Drawing Sheets

METHOD OF FABRICATING CERAMIC TILE

RELATED APPLICATIONS

This application is a divisional application of a previously filed U.S. application Ser. No. 07/574,588 filed on Aug. 29, 1990 for Ceramic Tile, now abandoned.

BACKGROUND OF THE INVENTION

1. Field of the Invention

This invention relates to the fabrication of ceramic tile and more particularly to a ceramic tile obtained with a stonework base and furnished with a glazed, metallized layer which is resistant to acid rain, absorbs a lesser amount of water than tile traditional tiles and weighs less than them as well.

2. Description of the Related Art Including Information disclosed under 37 C.F.R. §1.97–1.99.

There have traditionally been two types of tiles, those called Arabic tiles and the Roman ones, both of which are obtained from baked clay which form, when they overlap laterally and longitudinally, a grooved or fluted roofing in the direction of the slope, which directs rainwater towards the eaves.

Another type of covering for the roof consists of slate slabs. The slates also called clay schists are rocks which are easily subdivided into sheets or laminas according to the parallel planes between them called schistose planes.

The slate rocks come from the transformation by hardening and lamination of clays which, after having undergone great pressures during the intense movements of the earth's crust, have lost their plastic nature, their colour and texture, due to the high content of carbon and bituminous substances. As a result of their relative light weight and their resistance, they are used in the making of roofs.

Eventually, mosaic roofs have also been covered with bright colours, but such coverings have sought and obtained an ornamental, decorative effect within Modernist architecture in which the mosaic plays a major role. A practical effect was never sought beyond the decorative one and its implantation was always carried out in a traditional manner, that is, the placement with mortar or cement, as if it were pavement.

The Roman and Arabic tiles commonly used in the southern countries, have in their favour, their diffusion, their proven effectiveness and their easy placement. Their negative aspects are their heavy weight, about forty kilos per square meter, a high humidity absorption index (about 16%) and a limited resistance to frost which in the best of the cases does not exceed 25 cycles of freezing - defrosting continually. In addition, they absorb a great deal of heat,and their resistance to pressure is about 100 Deca-Newtons for a thickness of between 15 and 20 millimeters. And finally, they require roofs which do not have a great deal of inclination and their traditional aspect only suits very classic constructions.

The slate used in the slabs in the coldest, rainy areas and with greater incidences of snowfalls and a freezing - defrosting system, turns out to be expensive and laborious to obtain, calibrate and place. It should be homogenized in terms of thickness and therefore needs to be defoliated with meticulous care, then cut and finally drilled.

Leaving aside the fact that the surface area to be covered must be carefully prepared, for example, with a copper plate base and that the slabs have to be run through and then anchored afterward s with hooks, the slate has always been more expensive than the tile due to its unit cost and the laborious nature of its placement.

The s late has, on its behalf, a greater water-proofing ability than the tile, it admits inclinations almost to a vertical position and has a high resistance to freezing - defrosting effects, but as a disadvantage, it costs more. In addition, it is less resistant to wind and requires very specialised manpower from the initial process of its obtainment until the final placement.

The greatest virtue of me tile in relation with the slate slab lies in the fact that the former one is obtained from an industrial process, in which the clays, moulding type, baking temperatures, have all been selected and stabilised to finally produce a homogenous product in terms of its characteristics, dimensions and costs. Slate, to the contrary, depends on the deposit of the rocks, the pressure of the formation and the contents of its composition.

Attempts have been made to replace the slate tile with slabs obtained through an industrial process, using pressed layers of materials with resins, glues or cement as the binding matter. However, a product capable of successfully meeting the costs of the tile and the services of the slate slab has not yet been achieved.

SUMMARY OF THE INVENTION

The need to obtain new materials which will make it possible to successfully conclude new building techniques and satisfy the need, on the other hand, to obtain elements capable of adequately meeting the atmospheric agressions which the intense industrial activity imposes upon us, have led to a serious and methodical attempt in search of an alternative piece which might be obtained from a controlled and precise industrial process to combine superior qualities with any of the traditionally used elements such as the tile and slate slab, at the same time that it does not present any of their defects.

The invention consists of a ceramic tile which is obtained with a sandstone base, presented in a modular form. It has a higher dimensional homogenity than the tile and several properties which are better than those of the slate slab.

Initially the tile in question is obtained in a manner which is very similar to that which is used for the production of ceramic parts with a stoneware base. However, its structural problem is different because its tridimensional constitution, its location, its function and its behaviour are also different to those which the ceramic slabs placed on the walls and floors have to present, suffer and offer.

One begins with a stoneware powder which is used to fill a mould on which a counter-mould exercises a pressing action. The powder then occupies the inside of the mould taking on its form and it is compacted to a consistency which will be reinforced after baking in an oven.

The baked and stabilised part is submitted to a glazing process, with a final baking phase, which completes it.

The subsequent use of the part as a flat tile involves certain structural characteristics which condition the mould and the moulding form, and they also intervene in the composition of materials and in the final glazing.

In the first place, the part has to be hung, that is, remain strung on a prong or on the head of a screw - spike, nailed into the structure which has to be covered. For this reason, the part must have an opening, an opening which remains hidden, that is, it must be overlapped by the part or parts set above, in order to extend in all directions to form a scale similar to that of the fish, which would prevent the passage of water.

The opening in question has to be obtained from a mould that is simultaneous to the moulding of the part, a subsequent drilling operation must be carried out before the final glazing phase. This is a slow, expensive and difficult process and it creates additional problems of tensions which will be produced in an inevitable manner in the final glazing phase in which the temperature will increasingly exceed one thousand degrees Centigrade.

It is necessary, then, to resolve the problem in the moulding operation so that the part is entirely compacted, has a correct pressing and remains free of tensions.

A pressing mould of ceramic parts which simultaneously produces an opening is an atypical mould. It does not have any precedents and so it presents unknown problems.

A mould has been constructed whose flat plane, that is, the area which forms the surface of the part to be, glazed, presents an extending punch. In the counter-mould, an opening has been made and so, when it is pressed, the punch aligned with the opening in the counter-mould and the pressing has been correct. The molded part, however, has presented problems of demoulding due to its punch and the radial cracks which start at the opening. These cracks are the result of tensions and there is no doubt that they affect the mass on the part until it becomes unacceptable.

Looking for a different solution, an opening has been made in the bottom of the mould, in which there is a retractable embolus. This embolus with a flat convex or conical head, is pushed first through a tubular casing which emerges from the counter-mould, and when it descends it reveals a nozzle in which a spout is blowing.

The casing of the counter-mould is nailed first in the powder until it touches bottom, that is, until it initially pushes the embolus. Then, another embolus descends through the inside of the casing and gently compresses the powder, overcoming the spring which supports the embolus from the bottom of the mould, until the semi-compressed powder faces the nozzle. With the action of the blower, as it descends, it pushes the powder from the inside of the casing, and the powder is expelled.

The total descent of the counter-mould causes the total expulsion of the powder, the reinforcement of the sleeve and the compression of the powder which will form the piece.

And finally, a finished piece is obtained in which there is a perfect circular opening. However, at times, cracks can also be produced and the tensions are not entirely eliminated.

The system in question, despite being resolved, in a craft manner in the form of a testing prototype has proven more reliable than the previous one, that is, that of the emerging punch, but it turns out to be more complicated and much slower.

A third solution consists of making an outlet opening in the bottom of the mould. The powder once it is distributed in the mould begins to fall, to form a cone similar to what is produced in a sand clock. This cone initially admits the punch which emerges from the counter-mould, and as it descends, is inserted in the cone, pushing the excess powder to penetrate into the opening at the bottom of the mould.

Many tests have been necessary in order for there to be no lack of material at the upper border of the cone when the counter mould drops. Such a lack of material would diminish the characteristics of the piece.

The most adequate granulometry of the powder was sought and the most suitable speed for filling the mould was found. Tests were also carried out in the displacement of the mould from the filler to the press, seeking the ideal synchronisation between the relative descending speeds of the counter-mould and the positioning of the mould.

The final result has been encouraging. However, the tensions, appearing in the form of twisting cracks reveal a lack of pressure around the opening and consequently, a loss of compacting and mechanical characteristics.

Three different approaches present similar final problems and the problem of the opening was considered as resolved from the beginning. The next step was to prepare a mould for obtaining a final piece of the required characteristics, because the tests on the opening had been executed in the moulds withdrawn from the slabs for tile floors, with forms which have fallen in disuse. A rapid and inexpensive way of testing was sought simply in order to resolve the problem of the opening in the tile.

As will be clearly shown farther on, the tile can take on a simple rectangular form but due to aesthetic necessities, a design has been sought which can, within certain dimensional constants, vary in regard to form and size.

As has already been specified, the ceramic tile has to be hung on the head of a prong or on a screw emerging from the plane which defines the surface to be covered by the tile. This "hanging" system is traditional, but it has proven to be effective and nothing, for the moment, justifies changing it.

That head emerges above the pane of the tile. The interspace between the opening and the head is filled with a neoprene mass.

The diameter of the opening is around one centimeter and is situated between the axle of longitudinal symmetry of the part close to the upper end so that the piece, due to gravity, tends to sway back and forth, centering itself in order to remain in the correct position.

For reasons of weight and appearance, ingoing grooves were made laterally on the borders corresponding to the upper corners and on the opposing border, there is a piece forming a projecting curve. These forms do not condition the part and can be more or less accentuated. There is only one requirement and it is to accomodate the head of the hooking element of the tile, which is below the head which has to be, in part, covered by the one above and by the adjacent one.

In principle, the question was settled by making two lateral grooves which half-surrounded the hooking head of the lower tile. However, the groove limits the possibilities of the on-the-job placement, making a single overlap necessary, that is, to always maintain the density or number of pieces per square meter.

And finally, the question has been resolved by making two rabbets on the straight sides of the piece, whose width and depth are suited for comfortably containing the hooking head so that they offer the possibility of varying the overlap. In this way, the number of pieces per square meter is of a more or less equal length to the distance between the hooking opening and its far end, with a certain minimum determined by that distance.

This solution is perfect because it creates smooth sides, making it possible to distribute equally the distances on the roof and not put any limits on the constructor, giving him full liberty to work. However, it provides more problems for the industrial obtainment of the part.

In fact, as in the case of the opening, the first pieces for testing were mechanised by means of a pressing system but it was an unacceptable solution due to the cost, the time and the aggression to the compactness of the material.

Here, in the solution to this problem in the pressing operation, the definitive resolution for the problem of tensions and cracks presented in the opening, has indirectly been obtained.

Given that the mould is a simple box made up of walls and a highly resistant bottom and that the lower side or the side seen is flat, the grooves have to be made on the upper side, but the filling of the mould by part of the powder is level, that is, homogenous and shared evenly. Therefore, the problem arises of obtaining a negative and in order to do so, the mould was furnished with a positive. It was noted in the first tests carried out as well with a mould withdrawn from production, that breakage or cracks were produced in the borders which the adequate pressure was not reached in the central part.

It was also noted that in a two-phase pressing, an initial pressing only at the areas in which a depression or emptying had been produced, made it possible to suitably compact those areas, improve the borders and allow in some way the material in a powdered form, to accomodate itself before receiving the pressure or final pressing.

This final observation led to the modifying of a counter-mould of a projecting step with a width of about eight millimeters in the entire peripherie. The projections were prepared which had to lead to the depressions and a projecting step was prepared around the pivot of the opening or on the other hand, a deep orthogonal fluting was made of about two to three millimeters on the central area.

Thus, a rectangular mould, with an opening in its bottom, with a punch in the counter-mould and with projections for the casts, was furnished in the counter-mould, with a peripheral projecting step and an annular projecting step around the punch. The mould in question was placed in the machines. The suitable powder compositions were prepared. The filling speeds of the powder, the advancing rate of the mould and the descending of the counter-mould were synchronised, and a perfect part was obtained after a two-phase pressing which was repeated as many times as the operation itself was repeated.

During the initial pressing, the powder at the borders, which was found in the cone around the opening and that of the casts, was set perfectly The central powder acting as a real semi-fluid was accomodated towards the tension-free center and the striating in the bottom of the counter-mould was compacted in a perfectly balanced manner.

It was only necessary to modify the system of application of the glazed enamel so that the enamel occupied the outside surface and the side surface to obtain a perfect part in an automated industrial process with a full reliability of execution.

The characteristics of inalterability or resistance to the acid rain were conferred upon the part thanks to the prior "synterization" to which the enamel was submitted before being crushed and converted into powder for subsequent application in a conventional manner.

BRIEF DESCRIPTION OF THE DRAWINGS.

As a means of illustrating what is put forth, a set of drawings is enclosed with the present report, which show in a schematic manner, an example of a preferential execution of the invention, without their supposing any limitations on the practical possibilities for its execution.

THE PREFERRED EMBODIMENT

Figure 1:
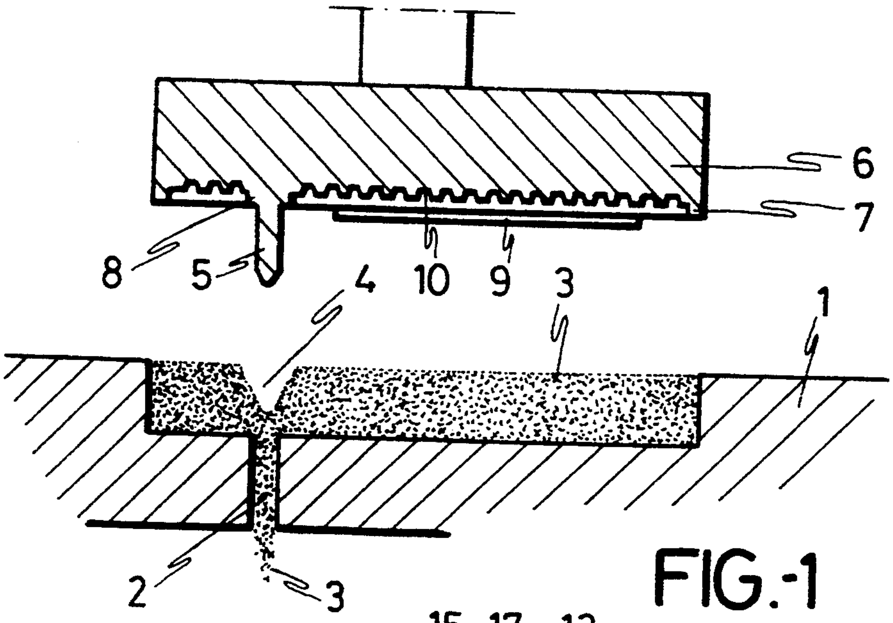
FIG. 1 shows the details in a longitudinal section of the counter-mould, the mould, the opening of the powder outlet and the powder.

The tile, as one can see from the afore-mentioned drawings, is obtained in a mould 1, in whose bottom, an opening 2 has been made, by which the powder 3 falls, preparing a cone 4 in which a punch 5, furnished in the counter-mould 6 will be put in, pushing and separating the powder 3 until it is lodged in opening 2.

As can be seen in the drawing—FIG. 1—, the counter-mould 6 presents a perimetric projection 7. There is also another projection 8, around punch 5, which has been furnished with the projecting steps 9 and which will lead to the casts housing the retention heads of the tiles. The orthogonal grooves 10 have also been shown which will lead to the projections which will absorb the tensions in the powder mass.

In a preferred execution, as the one shown in the example, natural kaolinithic-ilithic clays of a red or white baking have been used, extracted from the areas of Valencia, Castellón and Teruel (Spain), located in the Mediterranean basin.

A sifting control of the clay powders establishes 7% of 53 micres, 1% of 125 and 0% of 240.

A 2% total of carbonates in the atomised product has been verified along with a rejection of 4% of 53 micres and 5 of 125 micres.

The granulometry of the atomising has been established at the following:

| | |
|---|---|
| 425 micres | 11% |
| 351 micres | 30% |
| 246 micres | 29% |
| 177 micres | 16% |
| 124 micres | 7% |
| 74 micres | 4% |
| 53 micres | 1.2% |
| −53 micres | the rest until 100% |

The humidity of the powder was established between 5 and 5.5% water according to weight. A progressive hydraulic press was used with a pressure of 290 kg./cm$^2$ and in the floor or counter-mould 6, a brusque drop was programmed until punch 5 filled the opening 2 and the projecting step 9 established contact with powder 3.

Counter-mould 6 descended slowly in order to effect a first pressing of up to 50 kg/cm$^2$, rising sufficiently in order to free tensions and descend slowly once again and exercise a pressure between 280 and 300 kg/cm$^2$ in order to finally rise in a brusque manner.

It should be remembered that between the filling of the mould 1 and the descent of the counter-mould 6, there is a loss of powder 3 through the opening 2, so that there ,is a synchronisation of movements between the filling of the mould, the displacement and the first pressing so that no losses in the final volume are produced.

The apparent density of the compacting behind the press is 2.15–2.17 grams per cubic centimeter while the end of the baked part is 1.9 to 2.00. The baking is carried out at a conventional temperature of 1150° C. in a continuous tunnel, which is also conventional, with an advancing speed of the part of around 2.5 meters per minute.

The already baked tile obtained thusly heads for the enamelling operation and records a temperature of around 80° C. with a humidity of less than 1%. The enamel is found at a room temperature and is of the "synterization" type. It is enameled on the exterior side and also on the side borders, and is baked in a conventional oven at a temperature of 1150° C.

Figure 2:
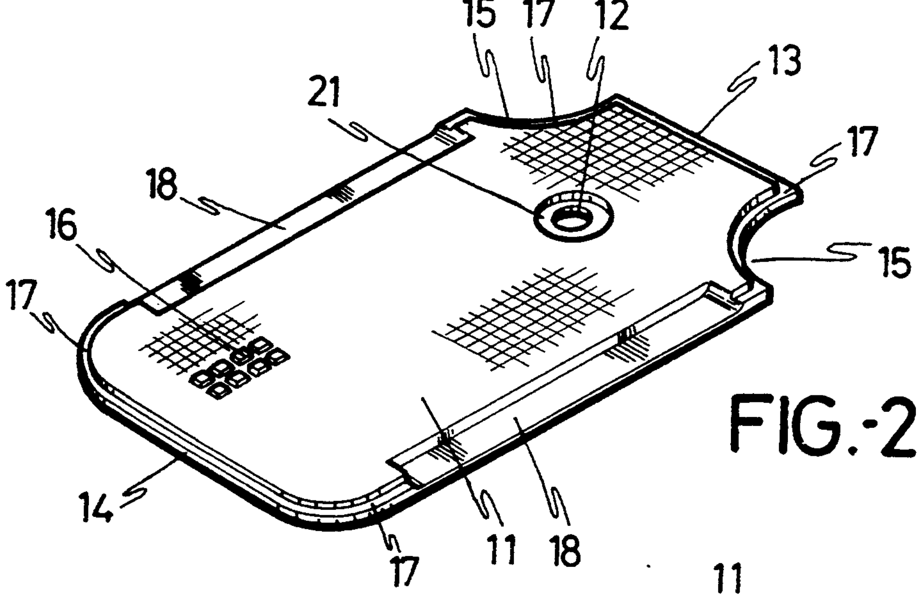
FIG. 2 shows a perspective of the tile, just as it comes out of the mould.
Figure 3:
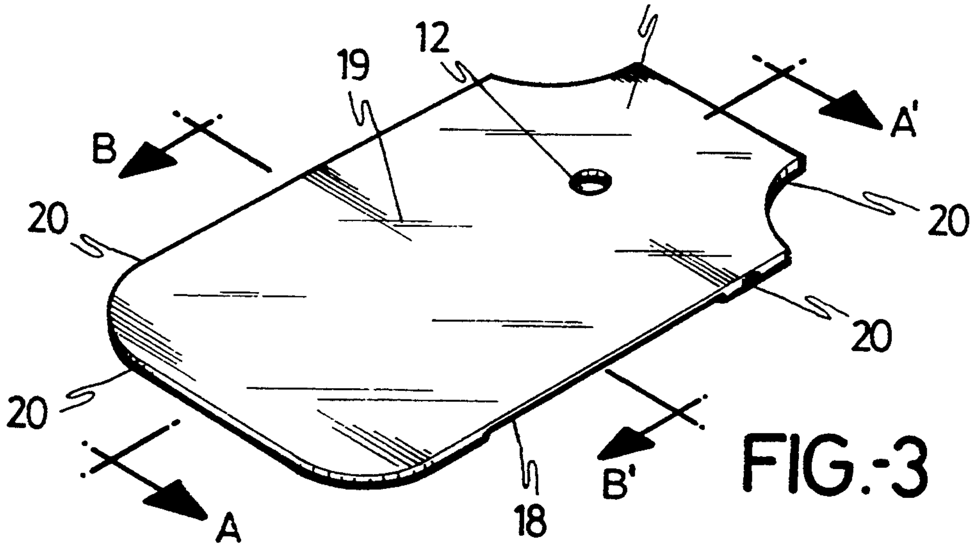
FIG. 3 shows a perspective of the tile, in the working position. Section A-A' is longitudinal and B-B' is transversal.

The piece obtained thusly, just as it appears in FIG. 2, is made up of a flat body 11 with a thickness of 8 millimeters which is inscribed in a rectangle. It presents, according to the axle of longitudinal symmetry and close to one end, an opening 12 for its anchoring to the roof. Opening 12 is close to an end 13 and is straight and perpendicular to the sides; the other end 14 is cut off for aesthetic reasons and its form is not relevant.

It should also be noted that the upper corners show notches 15 which relieve the weight of the part, save on materials and, what is indeed important, displace the center of gravity towards the opposite end, in such a way that the part, when it is hung, tends to be situated in an adequate manner.

Figure 4:
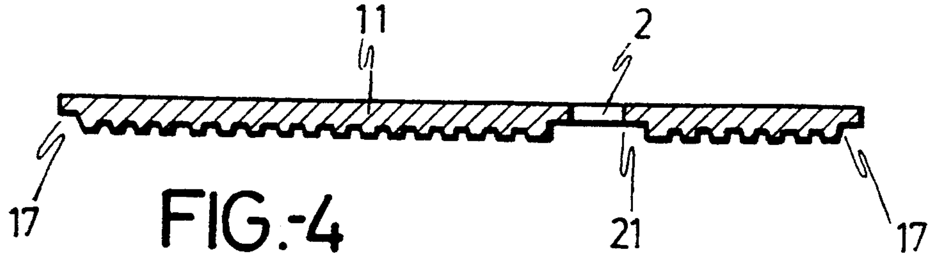
FIG. 4 gives a view of the tile according to section A-A'.
Figure 5:
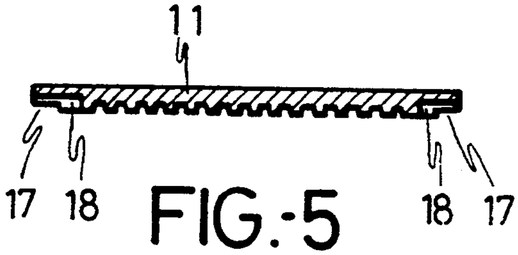
FIG. 5 shows a view of the tile according to section B-B'.

As illustrated in FIG. 2 and 4, around the opening 12, there is a descending step 21, in relation with upper striated plane 16, of the part 11. This is the area of prior pressing during the molding process. The peripheral descending scale 17 is also prior pressed and is designed to eliminate tensions directing them to the central area of the part where they are absorbed in the grooving 16.

The casts or grooves 18 located at both sides should also be pointed out and they make up the casing for the anchoring head.

The outer side 19 and the borders 20 of part 11 have a metallised, glazing "synterization" which is resistant to the acid rain remaining entirely unchanged at phase 4.

Rabbets 18, descending step 17 and the one foreseen 21 in the sections, around the opening 12, should be noted. Groovings 16 also appear which determine the upper plane making up the hidden face.

The part 11 constituted thusly is hung from opening 12 of the heads 22 nailed to the roof. These heads 22 project above plane 19 of the parts and the interspace between the head and the inside wall of the opening 12 is filled with neoprene. A head 22 has a height and the groove 18 has a depth greater than the height of a head 22, A groove 18 has a minimum width equal to the radius of the circular opening 12.

The first row of parts 11, hung from heads 22, receives the second row which hangs from the respective heads of the tiles and their casings or lateral casts 18 contain heads 22 of the first row.

Figure 6:
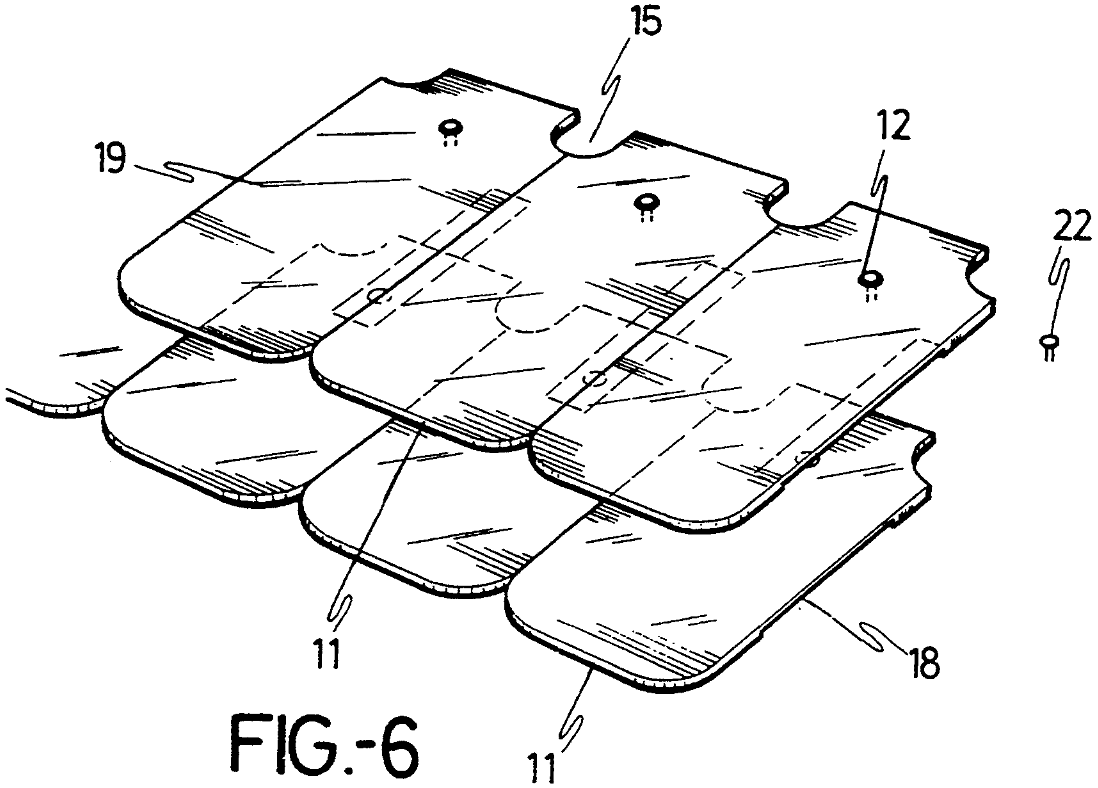
FIG. 6 represents an example of the use of the tile where it forms an overlap close to the maximum.

In accordance with the drawing—FIG. 6—the lateral casts 18 still make it possible to create greater separations between the rows of head 22, decreasing the overlap. Naturally, this distance can be decreased by increasing the overlap. The greater the distance between row of heads 22 and the next one, the less parts will enter per unit of weight. The reverse is also true; the closer they are together, allows the builder to make precise calculations and thus choose the most adequate overlap. The length of the groove 18 determines the maximum and minimum overlap between one and the other row of tiles.

Grooves 15 of the corners are entirely covered by the superposition of tiles so that an exterior, smooth, visible surface is obtained of great beauty- This surface is entirely water-proofed, of light weight, resistant to acid rain, cheaper than any of those obtained by means of the traditional tile or slate slab, more resistant and of an Unvarying appearance. It features a simple installment even for those who are not experts.

It should be pointed out that compared with the slate slab, the tile formed thusly, presents half the weight per unit of surface, which has a humidity absorption of 3% compared with approximately 8% of the slate and 16% of the traditional tile. It resists 75 continuous cycles of freezing - defrosting, and is much cheaper than slate, by about 50%, thus competing in a strong manner with the traditional tile, which it exceeds in every direction.

And finally, it is not considered entirely necessary to insist upon the object described for which any expert in the subject matter can, according to the contents of the report, carry out in practice.

I claim:

1. A method for fabricating a ceramic tile comprising the steps of initially pressing a ceramic or stoneware powder in a mold to form a tile having an opening located near an end of said tile extending between opposite surfaces of said tile with a descending step around said opening and lateral grooves extending along a length of said tile adjacent opposite edges of said tile and subsequently pressing said ceramic tile to form a hidden side of said tile having striations extending in two directions, baking said tile and glazing said tile on an outer side thereof.

2. The method of claim 1 wherein said step of initial pressing is at a pressure between four and six times less than the pressure of the subsequent final pressing.

3. A method for molding a generally flat tile body having an aperture for receiving a mounting member, comprising the steps of:

(a) providing a first mold having a configuration conforming to the general shape of a tile to be molded;

(b) depositing a powder of ceramic or stoneware in said first mold;

(c) providing a second mold having a prong extending therefrom and contacting said powder in said first mold to form an aperture in said tile body being molded;

(d) advancing said second mold into engagement with said powder;

(e) removing powder from said first mold in the area of contact between said prong and said powder;

(f) establishing a pressing force between said first and second molds;

(g) reducing the pressing force between said first and second molds;

(h) reapplying a pressing force between said first and second molds;

(i) removing said pressing force between said first and second molds;

(j) baking said molded body; and, (k) glazing a surface of said molded tile body.

4. The method of claim 3 wherein said powder is removed by an aperture formed in said first mold.

5. The method of claim 4 wherein a conical shaded cavity is formed in said powder.

6. The method of claim 3 wherein said second mold is configured to form grooves extending along opposite sides of the body being molded.

7. The method of claim 6 wherein said second mold is configured to form a step at said aperture being formed.

8. The method of claim 7 wherein said second mold is configured to form a plurality of grooves in a surface of said body.

* * * * *